United States Patent [19]
Peeples

[11] 3,805,228
[45] Apr. 16, 1974

[54] VEHICLE BRAKE LINING WEAR INDICATION APPARATUS

[76] Inventor: Allyn W. Peeples, 405 Robert Lee, Houston, Tex. 77009

[22] Filed: Apr. 20, 1972

[21] Appl. No.: 245,990

[52] U.S. Cl. .............................. 340/52 A, 200/61.4
[51] Int. Cl. .......................................... G08b 21/00
[58] Field of Search ............ 340/52 R, 52 A, 52 B; 200/61.4, 61.42, 61.44

[56] References Cited
UNITED STATES PATENTS
2,731,619 1/1956 Fratus .............................. 340/52 A
3,479,640 11/1969 Puma ........................... 340/52 A X

*Primary Examiner*—Alvin H. Waring
*Attorney, Agent, or Firm*—Pravel, Wilson & Matthews

[57] ABSTRACT

An apparatus for indicating the wear of vehicle brakes by sensing the amount of wear of the vehicle brake lining at each wheel, in three stages or states of wear, and giving an indication when the brake lining of a wheel is worn to a more severe or dangerous state than the other brake linings.

6 Claims, 4 Drawing Figures

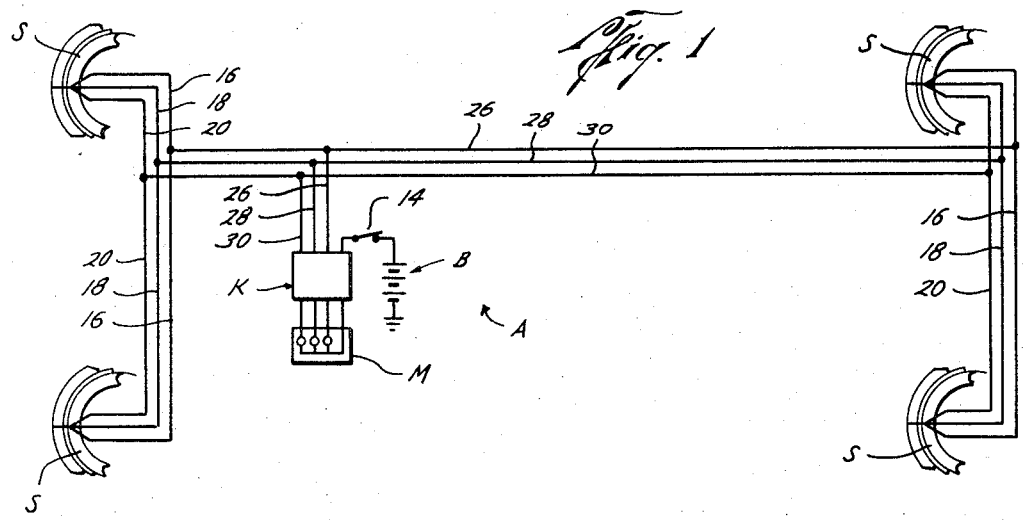
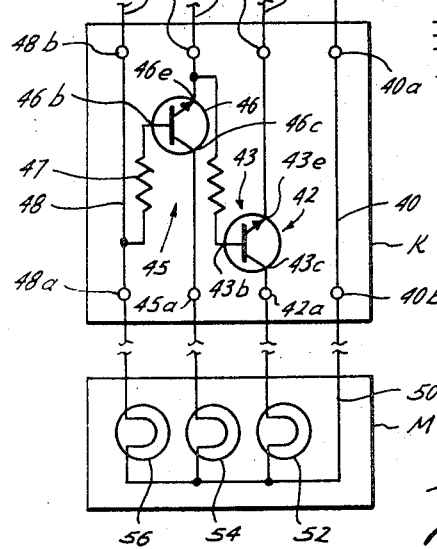
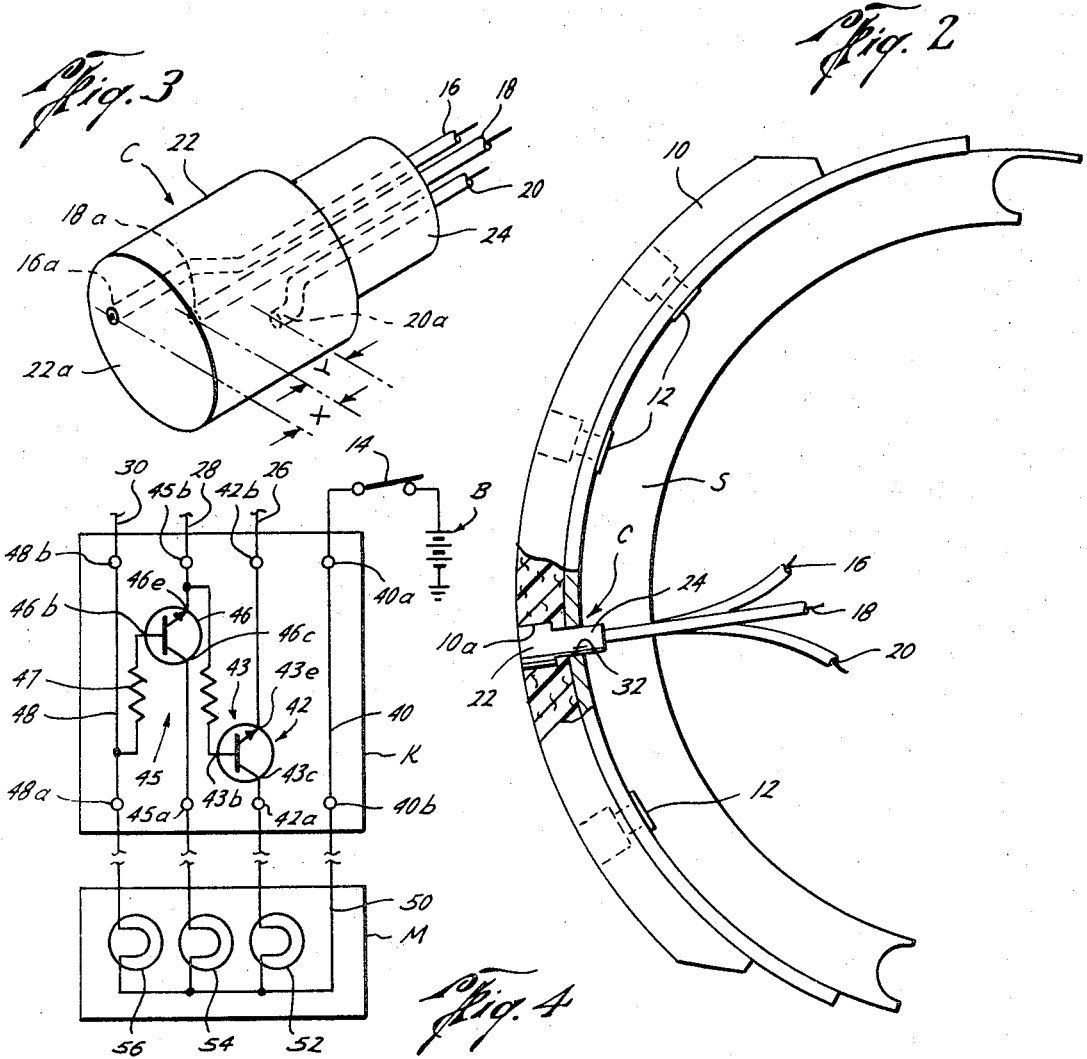

VEHICLE BRAKE LINING WEAR INDICATION APPARATUS

BACKGROUND OF INVENTION

The present invention relates to apparatus for indicating the wear of vehicle brake linings.

Certain prior art brake wear lining indicator apparatus such as that of U.S. Pats. Nos. 2,731,619; 3,271,737, and 3,479,640 included conductive metallic materials between the brake shoe and drum. This material engaged the brake drum when the brake lining had become sufficiently worn. If use of the vehicle continued, the metallic material would abrade the drum, scoring the brake drum and causing metallic particles or "junk" to accumulate between the brake shoe and drum.

Other prior art apparatus, such as that in U.S. Pat. No. 3,479,640, added electrical circuit components and connections, such as resistors, insulating material, and the like in the wheels with the brake shoes, making the apparatus expensive and cumbersome.

SUMMARY OF INVENTION

Briefly the present invention provides a new and improved apparatus for indicating the wear of brake linings in a motor vehicle with a contact having a plurality of electrical conductors mounted between the brake shoe and brake drum. Each of the conductors extends a different distance between the brake shoe and brake drum in order to sequentially contact the brake drum as the brake lining becomes increasingly worn. Alarm signal forming means are associated with each of the conductors in order to indicate that the conductor associated therewith is contacting the brake drum. The alarm signal means are controlled by an electronic circuit which controls the alarm signal means so that the alarm means indicating the most severe brake lining wear is energized, and the remaining alarm means are de-energized.

The electrical conductors of the contact are mounted in a bonding material of similar characteristics to the brake lining material, in order to minimize the formation of junk or debris between the brake shoe and brake drum during use. Further, the contact is mounted in a body of the bonding material adapted to be mounted within the brake lining to permit the apparatus to be readily used with vehicles. Further, the electrical conductors in the bonding material eliminate the need for moving parts for the wear indicating apparatus between the brake shoe and brake alarm.

BRIEF DESCRIPTION OF THE DRAWINGS

FIG. 1 is a schematic diagram of the apparatus of the present invention;

FIG. 2 is an elevation view, taken partly in cross section, of the apparatus mounted with a brake shoe;

FIG. 3 is an isometric view of a contact of the present invention; and

FIG. 4 is a schematic electrical circuit diagram of the present invention.

DESCRIPTION OF THE PREFERRED EMBODIMENT

In the drawings, the letter A designates generally the apparatus of the present invention for indicating the wear of brake linings on a vehicle. Although the disclosure herein will be made with reference to a vehicle having drum brakes of the well-known type, it should be understood that the apparatus A may be mounted within a brake lining in a caliper of a disc brake and used with disc brakes of the conventional type, having a circular plate or rotor as the brake drum, within the scope of the present invention as well.

The apparatus A is illustrated in the accompanying drawings as used with a vehicle having eight brake shoes S on the conventional drum brake type. However, it should be understood that the apparatus A of the present invention may be used with vehicles having more or less than eight brake shoes, if desired.

The brake shoe S has a brake lining 10 of the conventional type mounted therewith. The brake lining 10 may be mounted with the brake shoe S by a plurality of rivets 12, as is conventional in the art, as shown in the accompanying drawings. The brake lining 10 may also be mounted with the brake shoe S by bonding or other suitable adhesive mounting techniques, if desired.

Each of the brake shoes S has a contact C mounted therewith. Each of the contacts C are electrically connected in a manner to be set forth hereinbelow through a control circuit K to an alarm means M. The control circuit K receives operating electrical power from a suitable source such as battery B which may be the storage battery of the vehicle with which the apparatus A is used, or other suitable electrical source. The control circuit K is preferably electrically connected with the battery B through a control switch 14. The control switch 14 may be the vehicle ignition system switch of the conventional type, or an individual "On-Off" control switch for the apparatus A.

Considering the contact C in detail, such contacts are mounted with the brake shoe S within the brake lining 10. The contacts C are thus mounted between the brake shoe S and the brake drum (not shown) of the wheel of the vehicle.

The contacts C include a plurality of electrical conductors, each extending a different distance between the brake shoe S and the brake drum to sequentially contact the brake drum as the brake lining is then increasingly worn. In the embodiment shown in the accompanying drawings, three conductors are used: am Initial conductor 16, a Warning conductor 18, and a Danger conductor 20. The conductors 16, 18, and 20 are preferably mounted within a suitable insulative or insulated coating of the conventional type, such as plastic or other synthetic resin.

The conductors 16, 18, and 20 and their insulating coatings are mounted within the contact C. The contact C is preferably formed from brake lining material which is the same or has substantially corresponding characteristics to the material in the brake lining 10. As used in the present invention, the term "substantially corresponding characteristics" means that the contact C is formed from material which has generally corresponding physical characteristics such as wearing ability to those of the brake lining 10. For example, such material may be formed by pulverized brake lining material or particles obtained from new or discarded pieces of brake linings and which particles are bonded together by an epoxy resin or suitable bonding agent to form the contact C to the shape to fit the preformed hole in the brake lining. After the contact C is thus formed, it is preferably bonded in the recess of the brake lining 10 by a bonding agent such as an epoxy resin.

With the contact C of a material of substantially corresponding characteristics to the brake lining 10, and because of the small diameter of the wires 16, 18, and 20, junk is not formed between the brake shoe and brake drum which might interfere with the braking action or cause scoring or abrading of the brake drum during use.

The contact C is mounted within a preformed rivet recess or other opening 10a in the brake lining 10. Each contact C has an enlarged head portion 22 in which the wires 16, 18, and 20 are secured (FIG. 3). The Initial conductor 16 extends from a front surface 22a (FIGS. 2 and 3) of the head portion 22 of the contact C through the head portion 22 and a rear mounting portion 24 of the contact C to make contact with a return conductor 26 (FIG. 1). Accordingly, the Initial conductor 16 in each of the contacts C is electrically connected with the metallic brake drum of the vehicle and forms an electrical ground connection for the control circuit K, for reasons to be more evident hereinbelow. As portions of the brake lining 10 and contact C are worn away during use, the portion of the conductor 16 within the remaining part of the contact C remains in electrical connection with the brake drum.

An end portion 18a of the Caution conductor 18 is mounted within the head portion 22 of each of the contacts C a distance X (FIG. 3) inwardly from the face 22a. The Caution conductor 18 extends through the remainder of the head 22 and mounting portion 24 of the contacts C to a return conductor 28 for electrical connection to the control circuit K.

As is evident from FIG. 3, the head 22 of each contact C and the surrounding brake lining 10 must be worn away a distance X before the Caution conductor 18 contacts the grounded brake drum of the vehicle. It should be noted that at the time the end 18a of the Cauton conductor 18 contacts the brake drum, the portion of conductor 16 within the contact C remains in electrical connection with the brake drum also. As the brake lining 10 is further worn in use, the portions of the conductors 18 and 20 within the remaining part of the brake lining 10 retain electrical connection with the brake drum.

An end portion 20a of the Danger conductor 20 is mounted in the head 22 of each of the contacts C a distance Y inwardly from the end 18a of the Caution conductor 18. The distance Y is preferably equal to the distance X (FIG. 3), although this is not mandatory for operation of the present invention. The Danger conductor 20 extends from the contact C to a return conductor 30 for electrical connection with the control circuit K.

The end 20a of the Danger conductor 20 does not make electrical connection with the brake drum of the vehicle until the head 22 of the contact C and the surrounding brake lining 10 have been worn away a distance Y from the point where the Caution conductor 18 makes electrical contact with the brake drum. It should be noted that at the time the end 20a of the conductor 20 makes the electrical connection with the brake drum and during further use and wear of the brake lining 10, the Caution conductor 18 and the Initial conductor 16 are likewise in electrical connection with the brake drum.

The contacts C are mounted with the brake shoe S by inserting the mounting portion 24 through a suitable aperture or opening 32 in a brake shoe S. The contact C is so dimensioned that when mounted with a brake lining 10 of the type mounted by rivets 12 to the brake shoe S, the contact C may be inserted in a vacant rivet opening 10a in the brake lining 10 and thus mounted with the brake shoe S. When the brake lining 10 is of the type which is adhesively mounted with the brake shoe S, the contacts C may be readily mounted with the brake shoe S. After bonding the brake lining 10 to the brake shoe S, a hole is drilled or otherwise suitably formed corresponding to the opening 10a in the brake lining 10 and brake shoe S and then the contacts C mounted therein, in the same manner as with the rivet opening 10a.

Accordingly, each of the conductors 16, 18, and 20, in the contact C sequentially contacts the brake drum of the vehicle as the brake lining 10 is increasingly worn. As each of the conductors makes such sequential contact, the preceding conductors in contact with the brake drum remain in contact, as has been previously set forth. The control circuit K permits the alarm means M to indicate the most severe brake lining wear sensed by the contacts C mounted with the brake shoes S of the vehicle, in a manner to be set forth hereinbelow.

The control circuit K may be a printed circuit board, an integrated circuit or like semi-conductor means for performing the control functions to be set forth hereinbelow. An input conductor 40 of the control circuit K is electrically connected at an input terminal 40a through the switch 14 to the battery B (FIG. 4). An output terminal 40b of the conductor 40 is electrically connected to a buss or common conductor 50 of the alarm means M. Thus, with the switch 14 closed (FIG. 4), the buss 50 of the alarm means M furnishes electrical power to an Initial alarm 52, a Caution alarm 54 and a Danger alarm 56.

The alarms 52, 54, and 56 are illustrated in the accompanying drawings as incandescent lamps. It should be understood, however, that other suitable alarm signal means may be used, if desired. When the alarm signal means 52, 54, and 56 are incandescent lamps, the bulbs of such lamps are preferably distinguishably colored in order that the user of the vehicle may readily distinguish the alarm status of the brake lining wear.

The initial alarm means 52 is electrically connected to an input terminal 42a of an initial control circuit 42 in the control circuit K (FIG. 4). An output terminal 42b of the initial control circuit 42 is electrically connected to the return conductor 26 and from such conductor 26 to the initial conductor 16 with each of the brake shoes S of the vehicle. When the initial conductor 16 is in electrical connection with the brake drum of the vehicle at one or more of the brake shoes S, an electrical ground is provided through the conductor 16, the conductor 26, and the terminal 42b of the control circuit K to an emitter 43e of a control transistor 43 in the Initial control circuit 42. When the electrical ground is so furnished, the transistor 43 permits electrical current to pass from the battery B through the input conductor 40 of the control circuit K and the Initial alarm means 52 and the transistor 43 to the electrical ground with the brake drum. In this condition, the Initial alarm means 52 is energized, indicating that the initial state of brake lining wear is currently being sensed by the apparatus A.

A collector terminal 43c of the transistor 43 is electrically connected with the input 42a of the initial control circuit 42. A base terminal 43b of the transistor 43 is electrically connected through a resistor 44 to an output terminal 45b of a Caution control circuit 45, for reasons to be more evident hereinbelow.

The output terminal 45b of the Caution control circuit 45 is electrically connected to an emitter terminal 46e of the control transistor 46 in the circuit 45. A collector terminal 46c of the transistor 46 is electrically connected through an input terminal 45a of the control circuit 45 to the Caution alarm means 54 in the alarm means M. When the brake lining 10 and the head 22 of the contact C in one of the brake shoes S have worn the distance X, the end 18a of the Caution conductor 18 forms an electrical ground connection with the brake drum of the vehicle. Such ground connection is sensed over the conductor 18, and the return conductor 28 by the emitter 46e of the transistor 46 in the Caution control circuit 45. At this time, the transistor 46 is biased into conduction, permitting electrical current to flow from the body B through the caution alarm means 54.

When the transistor 46 is biased into conduction, current flows from the buss 50 through the Caution alarm means 54, energizing same. Alarm means 54 when energized indicates that one or more of the brake shoes S has worn away the distance X (FIG. 3) and that precautionary measures should be taken.

When the transistor 46 is biased into conduction, the emitter 46e is driven to an electrical ground condition. Such ground condition permits current to flow from the base 43b of transistor 43 through resistor 44 to ground, lowering the potential at the base 43b to a sufficient level to bias the transistor 43 into a non-conductive state. Transistor 43 returning to the non-conductive state blocks the flow of current from the buss 50 through the Initial alarm means 52, deenergizing same.

Thus, the control circuit K energizes the Caution alarm 52, indicating more severe brake lining wear in response to contact between the Caution conductor 18 and the brake drum, while deenergizing the Initial alarm means 52.

A base terminal 46b of the transistor 46 is electrically connected through a resistor 47 to a conductor 48 of the control circuit K. An input terminal 48a of the conductor is electrically connected through the Danger alarm means 56 to the buss 50 in the alarm means M. The conductor 48 provides electrical connection between the input terminal 48a and an output terminal 48b. The output terminal 48b is electrically connected through the return conductor 30 to the Danger conductor 20 in each of the contacts C mounted with the brake shoes S.

When the brake lining 10 and the head 22 of the contact C in one of the brake shoes S has worn the distance Y after the Caution conductor 18 has formed an electrical ground connection with the brake drum, in the manner previously set forth, the end 20a of the Danger conductor 20 forms an electrical ground connection with the brake drum. Such ground connection is sensed over the conductors 20, 30, and 48 permitting electrical current to flow from the buss 50 through the Danger alarm means 56, energizing same. Alarm means 56 when energized indicates that one or more of the brake shoes S has worn the distance Y from the degree of wear indicating the caution status, and that the brake shoes S have worn an undesirable distance and that repair or other precautionary measures must be taken for safety purposes.

When the ground connection is formed between the conductor 20 and the brake drum, an electrical ground condition is present at the conductor 48. Such ground condition permits current to flow from the base 46b of the transistor 46 through the resistor 47 to the ground, lowering the potential at the base 46b to a sufficient level to bias transistor 46 into a non-conductive state. When transistor 46 returns to the non-conductive state, flow of current from the buss 50 through Caution alarm means 54 is blocked, de-energizing the Caution alarm means 54.

Thus, the control circuit K energizes the Danger alarm 56, indicating more severe brake lining wear in response to contact between the danger conductor 20 and the brake drum in one or more of the brake shoes S, while de-energizing the Caution alarm means 54.

In the use of the present invention, the contacts C are mounted with the brake shoes S of the vehicle in the manner previously set forth. The end of the conductor 16 adjacent the face 22a with each of the brake shoes S is in electrical connection with the brake drum of the wheel. Thus, an electrical ground connection is provided over the conductors 16 and 26 to bias the transistor 43 in the control circuit K into electrical conduction, energizing the Initial alarm means 52. After sufficient use of the brakes of the vehicle, the brake lining 10 and contact C in one of the wheels wears the distance X (FIG. 3), forming an electrical connection at the end 18a of the Caution conductor 18 in such wheel. The electrical ground connection sensed by the conductor 18 is provided over the return conductor 28 to the transistor 46 in the control circuit K biasing the transistor 46 into conduction to energize the Caution alarm means 54 and de-energize the Initial alarm means 52. It should be noted that the ground connection at a single one of the conductors 18 is sufficient to provide a ground connection for the transistor 46 and cause the control circuit K to de-energize the Initial alarm means 52 even though the remaining brake linings and contacts C have not worn the distance X. In this manner, the control circuit K energizes the alarm means connected to the electrical conductor indicating the most severe brake lining wear in the brakes of the plurality of wheels of the vehicle, while de-energizing the remaining alarm means.

After further wear of the brake linings 10 in the vehicle additional conductors 18 may form a further electrical connection for a current from the transistor 46. However, since the transistor 46 has been previously biased into conduction in the manner previously set forth, the additional ground connections for the conductor 18 and return conductor 28 have no effect on the operation of the control circuit K.

After further use of the vehicle, one of the contacts C thereof wears away a distance Y (FIG. 3) after formation of electrical ground connection through the conductor 18, and electrical ground connection is provided over the conductor 20 to the control circuit K. At this time, the control circuit K energizes the Danger alarm means 56 and de-energizes the Caution alarm means 54.

It should be noted that with the apparatus A of the present invention, the control circuit K causes energization of the Danger alarm means 56 when a single one of the conductors 20 in the contacts C in the brake linings 10 of the vehicle forms an electrical ground connection with the brake drum. At this time, the remaining contacts C may be in varying states of wear with some or all of the brake linings 10 and contacts C having worn more than the distance X and forming an electrical ground connection through the conductors 18 for the Caution alarm means 54, or with some or all of the contacts C and brake linings 10 having worn less than the predetermined distance X.

Thus, the apparatus A provides the user of the vehicle with an indication of the most severe lining wear with the brake linings 10 in the brake shoes S of the vehicle.

The foregoing disclosure and description of the invention are illustrative and explanatory thereof, ane various changes in the size, shape, materials, components, circuit elements, wiring connections, and contacts as well as in the details of the illustrated circuitry and construction may be made without departing from the spirit of the invention.

I claim:

1. An apparatus for indicating the wear of a brake lining between a brake shoe and a brake drum in a vehicle, comprising:
   a. contact means including at least three electrical conductors mounted in the brake shoe lining for sequential engagement with the brake drum, each of said conductors extending a different distance within the brake shoe and relative to the exposed surface of the brake shoe lining to sequentially contact the brake drum as the brake lining is increasingly worn;
   b. said conductors of said contact means being mounted in a material to form a unitary assembly thereof;
   c. one of said at least three electrical conductors comprising an initial conductor extending through said contact means to the surface of the brake lining and electrically connecting to the brake drum to form an initial connection;
   d. signal means including at least three alarm means, each connected with a different one of said at least three electrical conductors, for indicating that the electrical conductor connected therewith contacts the brake drum;
   e. one of said at least three alarm means comprising an initial alarm means electrically connected to said initial conductor to indicate the initial state of brake lining wear; and
   f. circuit means for controlling said at least three alarm means, said circuit means energizing the alarm means connected with the electrical conductor indicating the most severe brake lining wear and de-energizing the remaining alarm means.

2. The structure of claim 1, wherein:
   said material having said conductors mounted therein comprises a material of substantially corresponding characteristics to those of the brake shoe lining.

3. The structure of claim 2, wherein said contact means comprises:
   a body formed from said material and having said at least three electrical conductors mounted therein, said body being adapted to be mounted within the brake shoe lining.

4. The structure of claim 1, wherein said circuit means comprises:
   a. power supply means; and
   b. semiconductor means for energizing the alarm means of said plurality of alarm means indicating the most severe brake lining wear, said semiconductor means further comprising means for de-energizing the remaining alarm means.

5. The structure of claim 1, wherein the vehicle has a plurality of wheels, each having a brake shoe and brake drum with a brake lining therebetween, and wherein:
   a. said contact means includes at least three electrical conductors mounted in the brake shoe lining for sequential engagement with the brake drum in each wheel, each of said at least three conductors extending a different distance relative to the exposed surface of the brake shoe lining and the brake drum to sequentially contact the brake drum as the brake lining is increasingly worn; and
   b. said circuit means includes circuit means for controlling said at least three alarm means, said circuit means energizing the alarm means connected with the electrical conductor indicating the most severe brake lining wear in the brakes of the plurality of wheels and de-energizing the remaining alarm means.

6. In an apparatus for indicating the wear of a brake lining between a brake shoe and a brake drum in a wheel of a vehicle having a plurality of wheels by forming warning signals when the brake lining is increasingly worn, the improvement comprising:
   contact means including at least three electrical conductors adapted to be mounted in the brake shoe lining of each wheel, each of said conductors extending a different distance within the brake shoe and relative to the exposed surface of the brake shoe lining of the wheel to sequentially contact the brake drum as the brake drum lining is increasingly worn;
   said conductors of said contact means being mounted in a material of substantially corresponding characteristics to those of the brake lining;
   said conductors of said contact means being mounted in a material to form a unitary assembly thereof;
   one of said at least three electrical conductors comprising an initial conductor extending through said contact means to the surface of the brake lining and electrically connecting to the brake drum of the wheel to form an initial connection;
   signal means including at least three alarm means, each connected with a different one of said at least three electrical conductors, for indicating that the electrical conductor connected therewith contacts the brake drum of the wheel;
   one of said at least three alarm means comprising an initial alarm means electrically connected to said initial conductor to indicate the initial state of brake lining wear; and
   circuit means for controlling said at least three alarm means, said circuit means energizing the alarm means connected with the electrical conductor indicating the most severe brake lining wear and de-energizing the remaining alarm means.

* * * * *